(12) United States Patent
Laden et al.

(10) Patent No.: US 9,002,939 B2
(45) Date of Patent: Apr. 7, 2015

(54) ADAPTIVE AND DYNAMIC REPLICATION MANAGEMENT IN CLOUD COMPUTING

(75) Inventors: Guy Laden, Jaffa (IL); Roie Melamed, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 13/487,203

(22) Filed: Jun. 3, 2012

(65) Prior Publication Data
US 2013/0325950 A1   Dec. 5, 2013

(51) Int. Cl.
G06F 15/16 (2006.01)
H04L 29/08 (2006.01)

(52) U.S. Cl.
CPC .................. *H04L 67/1095* (2013.01)

(58) Field of Classification Search
None
See application file for complete search history.

(56) References Cited

U.S. PATENT DOCUMENTS

| | | | | |
|---|---|---|---|---|
| 2003/0204509 | A1* | 10/2003 | Dinker et al. | 707/100 |
| 2003/0217245 | A1* | 11/2003 | Chase et al. | 711/170 |
| 2006/0224668 | A1* | 10/2006 | Ginis | 709/204 |
| 2008/0317051 | A1* | 12/2008 | Dantzig et al. | 370/401 |
| 2009/0182836 | A1* | 7/2009 | Aviles et al. | 709/213 |
| 2011/0184920 | A1* | 7/2011 | Vosshall et al. | 707/690 |

OTHER PUBLICATIONS

Terrace, Jeff, and Michael J. Freedman. "Object Storage on CRAQ: High-Throughput Chain Replication for Read-Mostly Workloads." In USENIX Annual Technical Conference. 2009.*
Laden et al., "Adaptive and Dynamic Funnel Replication in Clouds", LADIS 2011 Seattle, Washington, 2011.
Belaramani et al., "PADRE: A Policy Architecture for building Data Replication systems", Technical Report TR-08-25, 2008.
Wei Fu et al., "QoS-Guaranteed Ring Replication Management with Strong Consistency", Advances in Web and Network Technologies, and Information Management, Lecture Notes in Computer Science, vol. 4537, pp. 37-49, 2007.
Wei Fu et al., "QoS-awared replica placement techniques in data grid applications", Science China Information Sciences vol. 53, No. 8, Aug. 2010.

* cited by examiner

*Primary Examiner* — Ario Etienne
*Assistant Examiner* — Kidest Mendaye (57) ABSTRACT

A system for communicating information among a plurality of nodes of a network. The system comprises a plurality of disseminating modules installed in a plurality of nodes of a network which hosts a plurality of replicas of data having a plurality of objects, each the disseminating module has access to a dataset defining a plurality of write request dissemination topologies. Each disseminating module is defined to receive a write request from a client, to select dynamically one of the write request dissemination topologies according to at least one parameter of the client, and to disseminate the write request according to the selected write request dissemination topology.

25 Claims, 3 Drawing Sheets

ADAPTIVE AND DYNAMIC REPLICATION MANAGEMENT IN CLOUD COMPUTING

BACKGROUND

The present invention, in some embodiments thereof, relates to replica management in cloud computing and, more specifically, but not exclusively, to an adaptive and dynamic replication management in cloud computing.

Replication of objects, also referred to herein as replicas, in several locations improves the reliability, scalability and availability of web services in a network, such as a cloud network, whereby shared resources, software, and/or information are provided to client terminals, such as computers, servers, cellular devices and other devices over a network (typically the Internet). In particular, networks typically composed of geographically disparate data centers use object replication to support geographic redundancy for fault-tolerance, low access latency to customers, and/or horizontal scalability.

Some networks provide web services which require using strongly consistent replicas so that all accesses (e.g. read, write and the like) to the data in the replicas are seen by all parallel processes (e.g. nodes, processors and the like) in the same order, optionally sequentially. In such a manner, only one consistent state can be observed, as opposed to weak consistency, where different parallel processes (or nodes etc.) can perceive variables in different states. Strongly consistent replication is fundamental to critical application domains such as e-commerce, including online banking and stock trading, and is also often adopted for certain parts of web applications and sites such as password/account management. Developers also find it substantially easier to deal with strong consistency guarantees, as weaker semantics requires applications to resolve or tolerate conflicts which complicate application code and prolongs the development time.

SUMMARY

According to an aspect of some embodiments of the present invention there is provided a system for communicating information among a plurality of nodes of a network. The system comprises a plurality of disseminating modules installed in a plurality of nodes of a network which hosts a plurality of replicas of data having a plurality of objects, each the disseminating module has access to a dataset defining a plurality of write request dissemination topologies. Each disseminating module is defined to receive a write request from a client, to select dynamically one of the plurality of write request dissemination topologies according to at least one parameter of the client, and to disseminate the write request according to the selected write request dissemination topology.

According to an aspect of some embodiments of the present invention there is provided a method for communicating information among a plurality of nodes of a network. The method comprises managing a plurality of replicas of data, the plurality of replicas being stored in a plurality of nodes of a network with one of a plurality of disseminating modules and at any of the plurality of nodes a respective disseminating module is defined for: receiving a write request from a client, dynamically selecting one of a plurality of write request dissemination topologies according to at least one parameter of at least one of the client, the network and the write request, and disseminating the write request according to the selected write request dissemination topology.

According to an aspect of some embodiments of the present invention there is provided a method for communicating information among a plurality of nodes of a network. The method comprises storing a replica of data in a node of a network having a plurality of nodes storing a plurality of replicas, receiving a write request to update the data at the node from a client, dynamically selecting a write request dissemination topology from a plurality of write request dissemination topologies according to at least one parameter of at least one of the client, the network, and the write request, and disseminating the write request among the plurality of nodes according to the selected write request dissemination topology in association with an indicator of the selected write request dissemination topology.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to replica management in cloud computing and, more specifically, but not exclusively, to an adaptive and dynamic replication management in cloud computing.

According to some embodiments of the present invention, there are provided methods and systems of disseminating write requests from one or more clients among a plurality of replicas hosted in a plurality of nodes of a network according to dynamically selected dissemination topology in a strongly consistent manner. Optionally, the write request may be received at any of the nodes. The network may be a network cloud. Optionally, the dynamically selected dissemination topology defines a common tail node which receives acknowledge messages from all the nodes which receive the write request. This allows notifying the client about the outcome of the write request based on an analysis of the acknowledge messages. Optionally, the write request may be received at any of the nodes of the network. Optionally, some or all of the nodes are further configured to handle read requests which are received from one or more clients. Optionally, the dissemination topology is dynamically selected according to parameter(s) of the requesting client, the network, and/or the write request. In such embodiments, a desired tradeoff between latency and throughput may be achieved by selecting suitable dissemination topology. Possible dissemination topographies vary from star topologies to multiple node chains topologies, for example as described below. Optionally, dissemination topographies are dynamically updated according to monitored parameters, for example malfunctioning node(s), replicas' performances, new nodes and/or replicas and/or network parameters.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
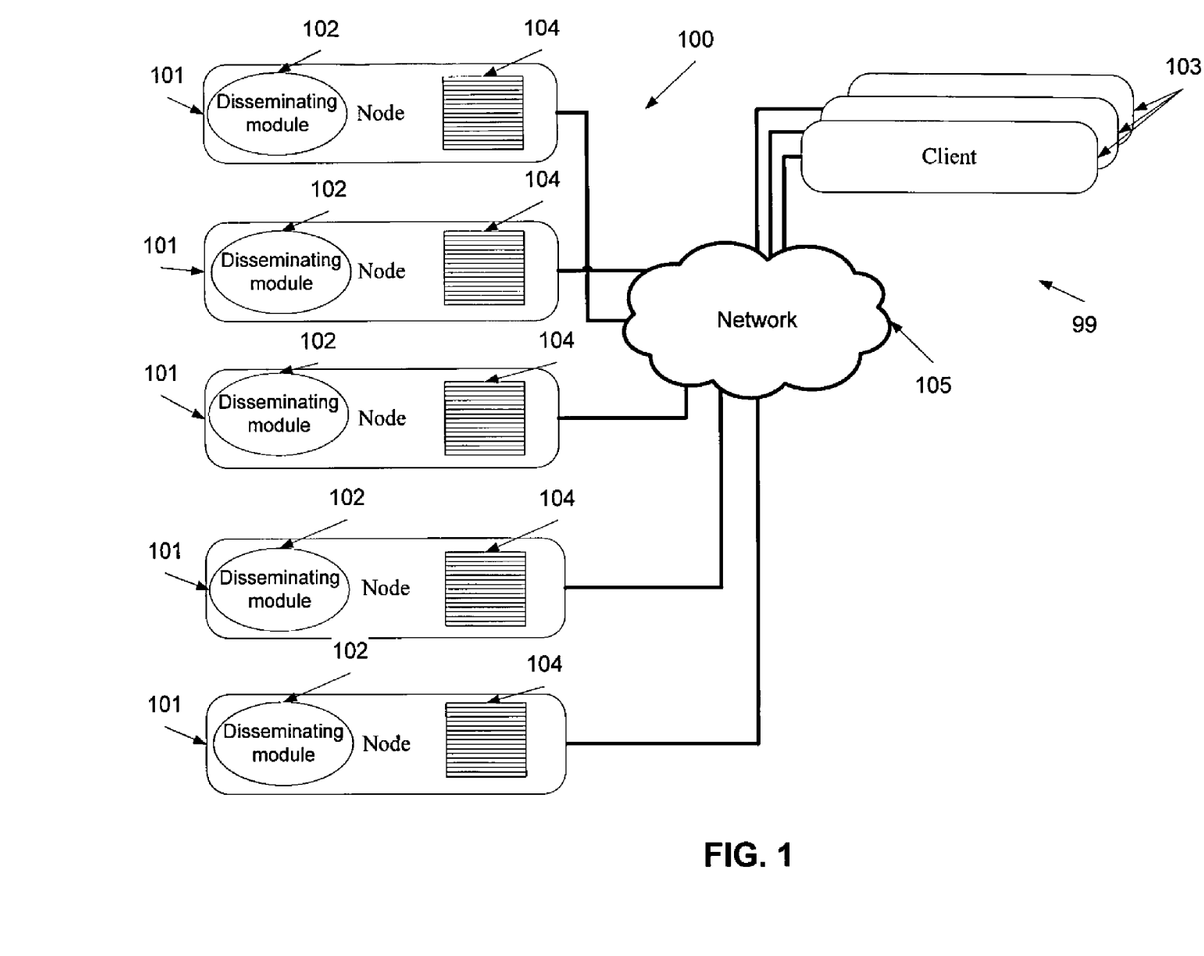
FIG. 1 is a schematic illustration of a system for disseminating write requests among a plurality of network nodes according dynamically selected dissemination topology to update a plurality of replicas in a strong consistency manner, according to some embodiments of the present invention.

Reference is now made to FIG. 1, which is a schematic illustration of a system 100 for disseminating write requests, optionally uncommitted, among a plurality of network nodes 101 according dynamically selected dissemination topology to update a plurality of replicas 104 in a strong consistency manner, according to some embodiments of the present invention. A node optionally comprises one or more computing nodes, optionally geographically distributed, for example one or more servers, which are optionally used to run one or more replicas such as virtual machines (a node may host one or more replicas). The node may be a cloud node. The replicas are optionally database replications, object replications, disaster recovery replications, and/or VM replications.

Each node hosts a disseminating module 102 and one of the replicas 104 (each of the disseminating module may or may not be part of the replica). As further described below, each disseminating module 102 has access to a dataset defining a plurality of write request dissemination topologies. For example, each disseminating module 102 may store a copy of a number of vectors (i.e. tables) each indicating an order of dissemination of a write request among the plurality of nodes 101. Optionally, each one of the dissemination topologies include all nodes 101 with replicas 104 and achieve a desired tradeoff between latency and throughput. Some dissemination topologies may be adapted to work around one or more replicas, for example slowly updated replicas, and/or to achieve a higher throughput if the network has replicas with heterogeneous performance levels. Optionally, the performances of replicas are continuously monitored to allow dynamically adjusting and/or setting dissemination topologies which work around slow replicas. The adjusted and/or set updated dissemination topologies are optionally sent using update messages, for example as described below.

Optionally, as further described below, the system 100 teaches a dynamic selection of dissemination topologies which support a strong consistency replication in the network 99. This environment may be characterized by a relatively high latency communication between data center nodes, significant fluctuations in the performance of seemingly identical replicas, such as VMs, and temporary disconnects of data center nodes from rest of the nodes in the network 99. The communication among the nodes is optionally performed in an adaptive and dynamic protocol that is designed to accommodate arbitrary latency and/or throughput tradeoffs for write requests optionally when the VM performance varies. Optionally, the system 100 further provides high throughout and low latency and optionally high availability for read requests despite network partitions. The ability to adjust write dissemination topologies allows achieving, per write request, a desired tradeoff between latency and throughput, depending on client parameters, such as a service level agreement (SLA), a payment plan and/or a ranking, network parameters such as observed network condition(s), for example throughput and/or latency probing outcomes and/or write request parameters, such as write request size, an origin, and/or an indicator of the importance of latency of the write request, optionally as indicated by the client 103. The method improves write latency up to a factor of N/2 for N≥2 compared to the notable chain replication (CR) protocol; see J. Terrace and M. J. Freedman. Object storage on crag: High-throughput chain replication for read-mostly, workloads, USENIX, 2009 and R. van Renesse and F. B. Schneider. Chain replication for supporting high throughput and availability, In OSDI, 2004, which are incorporated herein by reference.

The dissemination topologies may consist of concurrent disjoint data replication paths so that load on high throughput paths is adaptively increased while load on congested replicas is reduced.

Reference is now made to an exemplary system, such as system 100, composed initially of an ordered view $V_0=\{R_0, R_1, \ldots, R_{N-1}\}$ of N>=1 replicas, where the replica with the highest index, initially $R_{N-1}$, is set as a tail node, for example as defined below. For a replica $R_i$, replicas $R_{i-1}$ and $R_{i+1}$ are set as predecessor and successor replicas, respectively. The tail commits a write request, sends an acknowledgement to the client 103 and propagates a notification of the commit along the chain of predecessors towards $R_0$.

Optionally, a highly available master service, also referred to as a service module, that detects failures of nodes hosting replicas and informs all replicas of the new view $V_{i+1}$ upon a failure of a replica in $V_i$ is used. Such a master service may be implemented using a locking service as described in L. Lamport. The part-time parliament. ACM Trans. Comput. Syst., 16(2):133-169, May 1998, P. Hunt, M. Konar, F. P. Junqueira, and B. Reed. Zookeeper: wait-free coordination for internet-scale systems, USENIX ATC 10, and/or M. Burrows. The chubby lock service for loosely-coupled distributed systems, OSDI 06 which are incorporated herein by reference. The master service may be required upon bootstrap, informing the replicas about $V_0$ and/or upon a replica failure/addition/removal. Optionally, a single master service may be used by a number of cloud services, for example a number of networks, each such as 99. Optionally, one or more of the replicas 104 implement fail-stop and reliable first in first out (FIFO) links models. Optionally, a tightly bound clock synchronization protocol, for example as described in C. Lenzen, T. Locher, and R. Wattenhofer. Tight bounds for clock synchronization. Journal of The ACM, 57:1-42, 2010, which is incorporated herein by reference and a lease protocol similar to a master lease described in T. Chandra, R. Griesemer, and J. Redstone. Paxos made live: an engineering perspective. In *PODC*, 2007, which is incorporated herein by reference, are implemented so that the dissemination has a less restrictive crash failure model.

Optionally, when a node hosting a replica $R_i$ receives from the master service a notification on a failure of another replica $R_y$, for example by receiving a new view from the master service, $R_i$ removes acknowledgements received from $R_y$ from local data structures. Additionally, if $R_i$ has an uncommitted write request req whose head replica is $R_y$, then it waits for is time units, where c denotes a constant typically set to the round-trip time (RTT), before sending req to all replicas hosting nodes, assuming $R_i$ did not receive a retransmission of req by another node in the last is time units.

Figure 2:
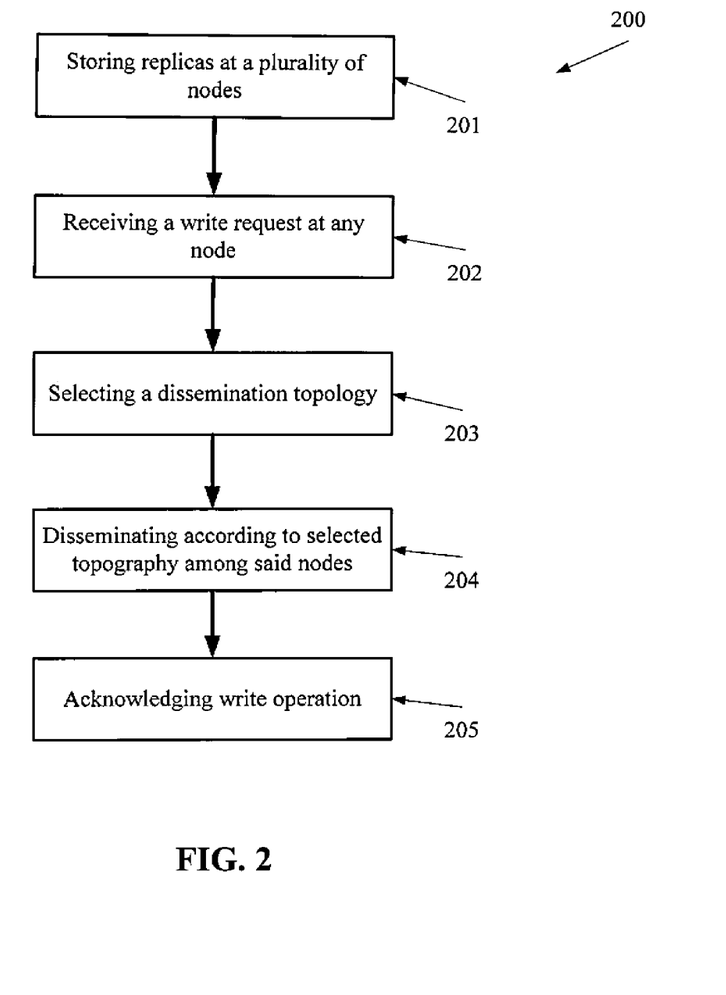
FIG. 2 is a method of dissemination of write requests among a plurality of nodes of a network, according to some embodiments of the present invention.

Reference is now also made to FIG. 2, which is a method 200 of dissemination of write requests among a plurality of nodes of a network, for example the network 99, according to some embodiments of the present invention.

The method is implemented in a network, such as 99, wherein each disseminating module 104 is defined to receive a write request from client(s). In such embodiments, a node, which receives write requests from client(s), may be referred to as a head. First, as shown at 201 and depicted in FIG. 1, each node 101 stores a replica 104 of certain data. Now, as shown at 202, any of the nodes 104 may receive a write request to update the data (e.g. create a record, edit a record, delete a record, duplicate a record, merge records and/or the like). The write request is optionally received from a client 103 of the network 99 via a network 105 (e.g. a local area network (LAN), a wide area network (WAN), the Internet, and/or Ethernet).

Now, as shown at 203, a write request dissemination topology is dynamically selected from a plurality of write request dissemination topologies according to one or more parameters of the requesting client, the network, and/or the write request. As used herein, a dynamically selected dissemination topology includes a dynamically adjusted dissemination topology, a dynamically created dissemination topology, and/or a dynamically built dissemination topology. As described above, the flexibility in the dissemination topology allows setting dynamically, per write request, a desired tradeoff between latency and throughput, depending on client, network, and/or write request parameters. Optionally, in use, a client, a network, and/or write request parameters are sequentially and/or continuously monitored, for example by one or more probes. In such a manner, dissemination topologies may be selected based on up-to-date statistics pertaining to network traffic and/or client ranking and/or SLA. Optionally, dissemination topologies may be added and/or updated by dissemination topology messages. These messages may be routed as write requests, with new dissemination topologies and/or instructions to edit dissemination topologies. For example, updated tables defining new and/or edited dissemination topologies may be distributed as write requests among the nodes for updating the dissemination topologies each disseminating module can select from.

For example, a dissemination topology may be dynamically adjusted according to parameters of a network such as a public cloud which involves high latency between data centers, for example, Amazon elastic compute cloud (EC2)™, and/or a network that provides a virtualized environment characterized by potentially large fluctuations in resource availability and performance of VMs, for example see S. K. Barker and P. Shenoy. Empirical evaluation of latency-sensitive application performance in the cloud. In MMSys '10 and J. Dejun, G. Pierre, and C.-H. Chi. Resource provisioning of web applications in heterogeneous clouds, In WebApps 2011, which are incorporated herein by reference. Selecting an appropriate write dissemination topology for this environment may have an impact on replication performances. For example, in the experiments described in chapter 4 of Guy Laden, Roie Melamed, Ymir Vigfusson, Adaptive and Dynamic Funnel Replication in Clouds, published in OSR (Operating Systems Review) January 201 (hereinafter: "the article"), which is incorporated herein by reference, multiple replicas stored in head nodes are employed with a star topology to achieve a throughput higher by up to a factor of 16 than CR protocol when the outgoing bandwidth is congested at some of the replicas. This is possible as the throughput of a CR protocol is constrained by the slowest replica in a single data path topology (chain) and in the method 200 and system 100 dissemination topologies are selected adaptively to shift load from outgoing bandwidth links from congested replicas to bandwidth links with more available bandwidth. As described in the article, when the number of replicas is 7 the method 200 and system 100 has a write latency that is up to a factor of 3.5 lower than the write latency of CR protocol. Additionally, the latency of disseminating write requests in these embodiments is substantially lower than the latency of disseminating write requests in CR protocol (up to a factor of four) in a single data center setting while the impact on the throughput is minimal.

As described above, the data maybe updated in the replicas according to various dissemination topologies in a strongly consistent manner. This assures that all write operations, and optionally read operations are executed in some sequential order and optionally that a read operation returns the latest written value.

Then, as shown at 204, the write request is disseminated, for example routed and/or funneled, among the other nodes according to the selected write request dissemination topology. Optionally, the disseminated write request is attached with an indicator of the selected write request dissemination topology. For example, as described above, each disseminating module 102 has an access to a dataset of dissemination topologies. Optionally, each one of the dissemination topologies is marked with a unique identifier (ID). In use, the write request is attached with the ID of the selected dissemination topology. Optionally, as shown at 205, some or all of the disseminating modules 102 send an acknowledge message to a designated node, also referred to herein as a tail node. Optionally, the tail node orders and commits which write requests have been received by all or most of the replicas. In such embodiments, the tail node may generate an acknowledge message to the requesting client 103. Optionally, an acknowledgement message contains a sender identity. In such a manner, the client is notified that the write request has been received and followed only after the tail node receive acknowledge messages from all or some of the nodes. In a topology having one or more chains receipt of a request at the tail from the last node in each chain implicitly indicates all replicas in the chain received the write request.

Figure 3A:
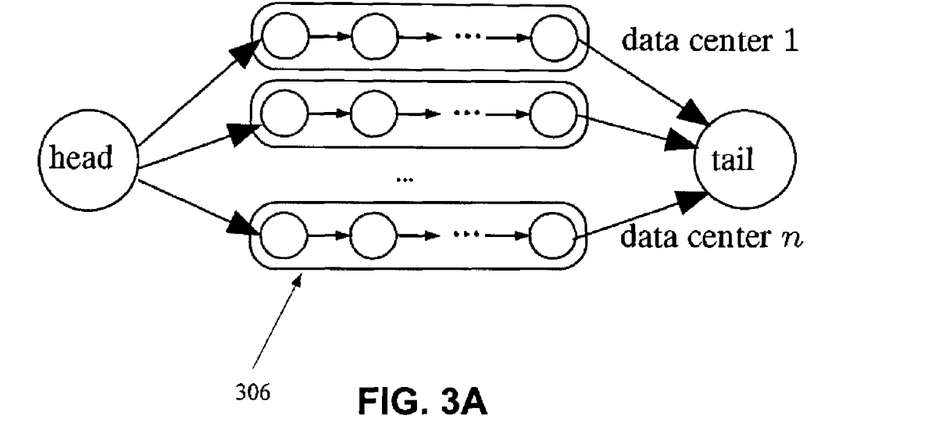
FIGS. 3A and 3B are schematic illustrations of write request dissemination topologies, according to some embodiments of the present invention.
Figure 3B:
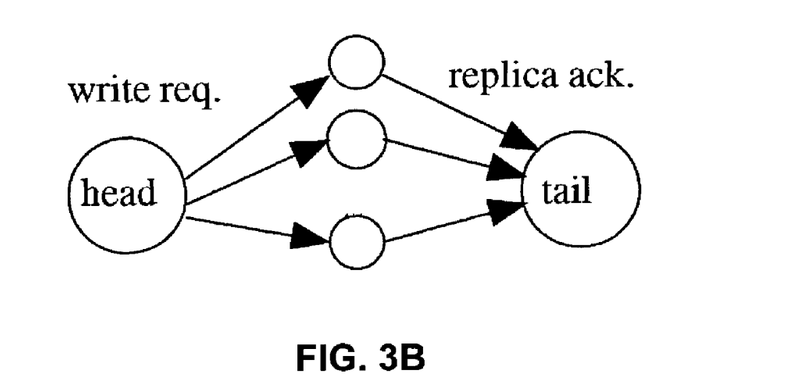

Two exemplary dissemination topologies are respectively depicted in FIGS. 3A and 3B, which are schematic illustrations of a set of chains topology and a star dissemination topology. In these dissemination topologies and/or optionally in others, a disseminating module that receives an uncommitted write request to a respective replica either forwards it to other disseminating modules of other replicas or sends a short acknowledgment message to the tail node, depending on the dissemination topology.

For example, in FIG. 3B, the head node forwards the write request to all other replicas in a first message round and all the nodes include replicas. These nodes send acknowledgements to a tail node in a second message round. Upon receiving N−2 acknowledgement messages from all replicas besides the head or more then N−2/2 acknowledgement messages when a majority protocol is used, the tail node may commit the write request. The tail node may receive uncommitted write request(s) from the head node before accepting the transaction.

FIG. 3A depicts a parallel chains topology where a head forwards write request to a first node in each one of the chains and each such first node forwards the request to the next node in the chain until the last node in the chain sends an acknowledgement message to the tail node, indicating that all the replicas in the chain have received the write request. In this example, the tail node may commit a write request once it receives acknowledgements from most or all of the D chains (taking into account the length of each chain when needed). This topology strikes a particular balance between latency and throughput by employing chains within a data center but not between data centers due to the latency considerations discussed above.

Optionally, once a request is committed by the tail node, it propagates a notification to all disseminating modules of replicas using a reverse topology to allow recovery and to enable all replicas to handle read requests. The reverse topology is optionally set according to the selected dissemination topology.

Optionally, the dissemination topology is adapted to the functionality of network. For example, in a multi data center cloud, a topology with D parallel chains, as for example as shown at 305 of FIG. 3A, may be set. Each chain is set to another of D data centers in order to achieve, in the absence of collisions, a write latency that includes only two WAN communication hops from each data center (since every replica may handle a write request). It should be noted that the write latency of a CR protocol includes D−1 WAN link delays when both the client and the node that receives the write request from the client are in the same data center and D WAN link delays if the client and this node are in different data centers. It should be noted that in the dissemination topology depicted in FIG. 3A, additional D brief acknowledgement messages are sent.

As described above, any of the nodes may receive a write request from one or more clients. In such architecture, two or more write requests which are related to a common object may be disseminated among the nodes. In order to avoid write collisions, the tail node may employ a collision handling protocol, for example, in order to maintain linearizability in the presence of parallel write requests to the same object, the tail node commits write requests according to a predefined order, for example according to a replica ID. The replica ID may be determined by the master service. This way, even under a failure of a tail node, a new tail node may commit the parallel write requests at the very same order as the old tail. If a number of write requests to update a common object are originated from the same head node, the earliest such request according to an order of arrival, for example from FIFO links between replicas, is considered for commit since subsequent write requests from the same head are not parallel requests. Hence, this ensures that there are no more than N parallel write requests to a given object, which means that parallel write requests cannot substantially increase the latency of a write request.

According to some embodiments of the present invention, the tail node set the write request ordering according to the write request ordering set by the head node. Optionally, each write request is issued with a clock dataset, such as a vector, referred to herein as a vector clock, to allow the tail node to determine when a write request may be committed. In such a manner, even if a tail node fails, a new tail node may use the same ordering base information to commit ordering policy. Optionally, each replica maintains a time tagging module, for example an integer counter that is incremented by one when a new write request arrives from a client. The vector clock of a write request req is set to be the vector $(vc_0, \ldots, vc_{N-1})$ where $vc_i$ denotes a value of a counter at replica Ri at the time of receiving req. The counters are propagated along with data and acknowledge messages so that the tail node receives a full vector clock for every write request. Every replica also maintains a local state where it stores the counter it associated with every write request as long as that request remains uncommitted. After failure, this state is sent to the new tail so that it too has all the vector clock information. Optionally, each replica except the tail node deals with tracking and sending its own counters and does not need to be aware of the counters of other replicas.

With a vector clock, a write request may be presented as a tuple (key, value, vector clock, originating head replica). This write request may be uniquely identified by the head node at which it was received and the value of the counter given to that request at that head. As total order on write requests may be defined as follows:

request a commits before request b if and only if: for each index i in the vector clocks of a and b, $a:vc_i \leq b:vc_i$ and there exists at least a single index j such that $a:vc_j < b:vc_j$ or a:originating_head<b:originating_head.

Using the total order, the following policy is used at the tail node to determine what requests to commit and when. The tail node maintains a set of uncommitted write requests for every object and adds entries or updates vector clocks in exiting entries as messages are received. An uncommitted write request req is committed by the tail node as soon as the following conditions hold:

i) the request data has been received by the tail node;
ii) the request vector clock has been fully determined, for example the counter assigned to the request by every one of the replicas is known to the tail; and
iii) of all outstanding requests for this object, the request is earliest in the commits-before relation.

Regarding condition iii), requests for which not all the vector clock counters have been received may be taken into consideration. When comparing a request a in which all counters in the vector clock are known to request b that has some unknown counters it is possible to conclude that a commits-before request b even before all counters in b are known if for all indexes i in the vector clocks which are known in both request a and b, $a:vc_i \leq b:vc_i$ and either there exists at least a single index j such that $a:vc_j < b:vc_j$ or a:originating_head<b:originating_head. This is due to the assumed FIFO property of the network links which ensures that if the tail has received a counter from a replica, then it is not possible to later receive a smaller valued counter.

It should be noted that when the tail node delays committing of some requests until the above conditions i)-iii) hold and the vector clock for a write request is fully determined by the tail node at most N-1 write requests may be committed before the delayed write request is committed. In such embodiments, after committing a write request req, the tail node does not receive a request that should have been committed before req. It should be noted that other time tagging methods may be used for tagging write requests for an ordering process that is a consistent upon node failures.

According to some embodiments of the present invention, the tail node is set to initiate periodically an update session by sending an update message to its predecessor replica in reverse dissemination topology. This message contains information regarding uncommitted write requests the tail node is aware of. Each node which receives an update message merges the received information with the local information on uncommitted write requests, updates the local data structures, and forwards the merged information to respective predecessor replica according to a respective topology. Additionally, if a replica Ri is informed by the update protocol that it is missing an uncommitted write request req that another replica Rj has, then Ri requests req from Rj.

Figure 4:
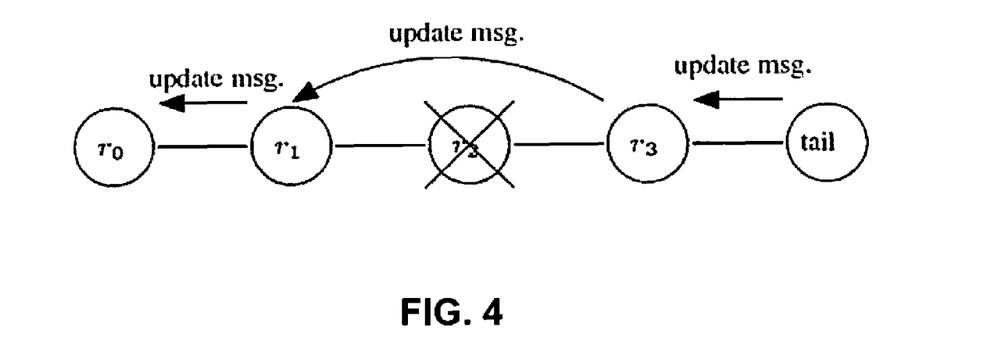
FIG. 4 is a schematic illustration of a tail node which disseminates update message to predecessor nodes which holds replicas, according to some embodiments of the present invention.

Optionally, a node that sends an update message to a predecessor node expects to get an acknowledgment message within a given timeout. Upon expiration of the timeout, if a node which includes replica $R_x$ does not receive an acknowledgment message, than $R_x$ optionally sends the update message to the following predecessor, namely to the predecessor of the predecessor if such a node exists, for example as depicted in FIG. 4. In such a manner, eventually, a given run of the update protocol terminates at $R_0$ or at $R_i$ if the node(s) of replica(s) $R_0$-$R_{i-1}$ fail. Finally, in order to achieve fast recovery in case of a failure of the tail node, a node that does not receive an update message for a certain period, for example C*update_timeout time units, initiates the update protocol. At a given node with replica $R_x$, upon receiving an update message whose source is node S that is not the tail node, the node of replica $R_x$ sends a message with metadata on all the uncommitted write requests it is aware of, optionally without sending payloads, to node S. Upon receiving this message, node S asks the node of replica $R_x$ to send it all the uncommitted write requests it is missing.

According to some embodiments of the present invention, as described above, some or all of the nodes 101 are set to receive read requests from one or more clients 103. Optionally, the read protocol is similar to a clean (committed)/dirty (uncommitted) protocol described in J. Terrace and M. J. Freedman. Object storage on crag: High-throughput chain replication for read-mostly, workloads, USENIX, 2009, which is incorporated herein by reference. Each node which stores a replica maintains two tables: a clean map which maps between an identity of an object and a last clean value of the object and a dirty map which maps between the identity of the object and a set uncommitted write requests. In a given replica, object obj is clean if and only if a local set of uncommitted write requests associated therewith is empty (Dirty<obj>). Otherwise, the object is dirty. At any node which holds a replica, a read request to a clean object is locally handled by sending the requesting client the local clean value. Optionally, a read request to a dirty object issued to a non-tail node includes a query for the tail node regarding to the object's last committed value. The tail node optionally handles both a read request to a dirty object and a query request with the exception that after a failure of a tail node, the new tail node resolves all the uncommitted write requests to a given object prior to handling either a read request or a query request pertaining to the respective object. As described above, upon a suspicion of a tail failure, the predecessors of the tail node initiate an update session, for example as described above, in order to eliminate delaying read and query requests at the new tail. An exemplary implantation of a pseudo-code of a read request is provided herein. The exemplary implantation presents data structures and a pseudo-code:

Variables:
ReadCounter an integer number that counts the number of pending read requests sent by clients to the current replica in this EpochNumber. Initially set to 0.
PendingReadRequests<ReadCounter, ClientId>—a map that maps between an identity of a pending client's read request to the identity of the client that sent this request.

Event Handlers:

```
1. upon receive <READ_REQUEST, ObjectId> from client do
2.     Set<WriteRequesId> set = Dirty.get(ObjectId)
3.     if (set == null) then
4.         send <READ_REPLY, Clean.get(ObjectId)> to client and exit
5.     PendingReadRequests.put(++ReadCounter,client)
6.     send <QUERY_REQUEST,ObjectId,ReadCounter> to Tail
7. upon receive <QUERY_REQUEST,ObjectId> from replica do
8.     if (Id == Tail) then
9.         send<QUERY_REPLY,ObjectId,Clean.get(ObjectId),
               ReadCounter> to replica
10. upon receive <QUERY_REPLY,ObjectId,ObjectValue,
         ReadCounter> from Tail do
11.    client = PendingReadRequests.get(ReadCounter)
12.    send<READ_REPLY,ObjectId,ObjectValue> to client
```

Reference is now made to an exemplary implantation of a write request dissemination in a star topology, for example of a topology as depicted in FIG. 3A. The pseudo-code provided herein presents data structures and a pseudo-code the exemplary implementation:

Data structures maintained by all replicas:
Id—this replica's identifier.
Tail—the tail replica's identifier.
Replicas—an ordered set consisting of all replica identifiers as retrieved from the master.
EpochNumber—an integer number persisted in the disk that counts the number of times this
replica has been restarted.
MinorWriteCounter—an integer number that counts the number of write requests sent by
clients to the current replica in this EpochNumber. Initially set to 0.
WriteCounter—a concatenation of EpochNumber (MSB) and MinorWriteCounter (LSB).
Clean ( ObjectId,ObjectValue )—a map that maps between an object identity to the associated
last clean (committed) value.
WriteRequestId—a concatenation of the associated head replica identity and the associated
WriteCounter.
Dirty (ObjectId,Set( WriteRequestId ) )—a map that maps between an object identity and a set
containing WriteRequestId of uncommitted write requests to this object.
UncommittedRequests ( WriteRequestId, (ObjectId,DirtyValue,Set<ReplicaId>) )—a map that maps between WriteRequestId to a tuple
consisting of the associated objected identity, the dirty value, and the set of replica identifiers
that acknowledged the reception of this write request.

Event Handlers:

```
1. upon receive <WRITE_REQUEST,ObjectId, ObjectValue> from
      client do
2.     WriteCounter++ concatenation of Id and WriteCounter
3.     addToDirty (ObjectId,Id||WriteCounter)
4.     addToUncommiteRequests(ObjectId,ObjectValue,Id||
           WriteCounter,client)
5.     send<WRITE_FORWARD,ObjectId,ObjectValue,Id||
           WriteCounter,client> toevery replicaeReplicas except Id
6. upon receive <WRITE_FORWARD,ObjectId, ObjectValue,
      WriteRequestNumber,Client> from replica do
7.     addToDirty (objectId,WriteRequestCounter)
8.     addToUncommiteRequests(ObjectId,ObjectValue,
           WriteRequestNumber,Client)
9.     send<REPLICA_ACK,WriteRequestNumber,ObjectId> to Tail
10. upon receive <REPLICA_ACK,ReqId,ObjectId> from replica do
11.    Set<ReplicaId> set = get set of acknowledgements from
           UncommittedRequests according to ReqId
12.    if (no entry associated with ReqId) then
13.        addToUncommiteRequests(null,null,ReqId,null)
14.        Set<ReplicaId> set = get set of acknowledgements
               from UncommittedRequests according to ReqId
15.    set.add(getReplicaIdFromWriteRequetNumber(ReqId))
16.    if (Id == Tail ∧ set.size( ) == |Replicas| − 1) then
17.        entry = UncommittedRequests.remove(ReqId)
18.        objectValue = entry.getDirtyValue( )
19.        if (objectValue = null) then get actual value from one of the
               replicas
20.            if (cannot get the dirty value from one of the replicas)
21.                then return failure to client and exit
22.        clean.put(ObjectId,objectValue)
23.        Set<ReqId> set = Dirty.get(ObjectId)
24.        set.remove(ReqId)
25.        send <CLIENT_ACK,ObjectId> to client as retrieved from
               Entry
26.        if (predecessor replica is not Tail) then
27.            send <ACK,ReqId> to predecessor replica
28. upon receive <ACK,ReqId>
29.    tuple = UncommittedRequests.remove(ReqId>)
30.    ObjectId = tuple.getObjectId( )
31.    Object Value = tuple.getObjectValue( )
32.    clean.put(objectId,ObjectValue)
33.    Set<ReqId> set = Dirty.get(ObjectId)
34.    set.remove(ReqId)
35.    if (predecessor replica != Tail) then
36.        send <ACK,ReqId>
```

Procedures:

```
37. addToDirty (ObjectId,ReqId)
38.    Set<ReqId> set = Dirty.get(ObjectId)
39.    if (set == null) then
40.        set = new empty Set<WriteRequestNumber>
41.        Dirty.put(ObjectId,set)
42.    set.add(ReqId)
43. addToUncommiteRequests(OId, OValue,ReqId,Client)
44.    tuple = UncommittedRequests.get(ReqId)
45.    if (tuple == null) then
46.        UncommittedRequests.put(ReqId,
47.            new Tuple(OId,OValue,new empty Set<ReplicaId>,Client)
48.    set = tuple.getSet( )
49.    replicaId = getReplicaIdFromWriteRequetNumber(ReqId)
50.    set.add(replicaId)
```

| | |
|---|---|
| 51. | if (tuple includes a null OId, OValue, and Client, fields) then |
| 52. | update these fields with the appropriate function parameters |

Upon receiving a write request (WRITE_REQUEST message) from a client (see line 1), the head replica increments a WriteCounter by one, adds the request to the Dirty and UncommittedRequests maps, and forwards the request to the rest of the replicas by sending a WRITE_FORWARD message to these replicas. Upon receiving the WRITE_FORWARD message from the head replica, the replica adds the request to the Dirty and UncommittedRequests maps as well as sending an acknowledgement (REPLICA_ACK message) to the tail replica. Upon receiving a REPLICA_ACK message with a given WriteRequestNumber denoted as ReqId from a replica (see line 10), the tail checks if the local UncommittedRequests map is updated with an entry whose key is ReqId. Typically, the tail receives a WRITE_REQUEST message with a given WriteRequestNumber from the head replica in the first phase of the write protocol before receiving a REPLICA_ACK message with the same WriteRequestNumber from a replica in the second phase of this protocol. In this case, upon receiving the REPLICA_ACK message the replica can retrieve the set of replicas that acknowledged this write request from the UncommittedRequests map. Otherwise, the current replica creates an empty entry with ReqId as the key. In both cases, the current replica indicates the reception of this acknowledgment from another replica. Now, the current replica checks if i) it is the tail replica; and
ii) if the number of acknowledgments received to the write request is equal to the number of the replicas minus one (as described below, if a replica fails, than each of the replicas deletes all the acknowledgments on write requests received from this failed replica). If i) and ii) are true, than the write request may be committed by the tail. Therefore, in these embodiments, the tail removes the entry denoted as entry associated with ReqId from the UncommittedRequests map, and then retrieves the dirty value of the relevant object from entry and assign this value to the local objectValue variable. If objectValue is null, i.e., the tail replica did not receive from the head replica a WRITE_FORWARD message with a WriteRequestNumber equals to ReqId, e.g., due to a failure of the head, then the tail tries to retrieve the associated object value from one of the replicas. If this attempt fails, then the tail returns a failure to the client and exits the event handler. Otherwise, the tail updates its Clean map with the new value, removes ReqId from the Dirty map, sends an acknowledgment to the client, and forwards the acknowledgment to its predecessor replica if such a replica exists. Finally, upon receiving an ACK message (line 28) the replica removes the relevant entry denoted as tuple from the UncommittedRequests map. The ObjectId and ObjectValue are retrieved from tuple, and the Clean map is updated with the committed write operation. The replica also updates the Dirty map by removing the ReqId from the pending write requests set, and forwards the ACK message to its predecessor replica if this replica is not the tail replica.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a node, a replica, and a module is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for communicating information among a plurality of nodes of a network, comprising:
   a plurality of disseminating modules installed in a plurality of nodes of a network which hosts a plurality of replicas of data having a plurality of objects, each said disseminating module has access to a dataset defining a plurality of write request dissemination topologies;
   wherein each said disseminating module is defined to receive a write request from a client, to select dynamically one of said plurality of write request dissemination topologies according to at least one parameter of said client, and to disseminate said write request according to said selected write request dissemination topology;
   wherein each of said plurality of nodes is set to receive a read request to read a selected object of a plurality of objects of said data and to retrieve a copy of said object from a respective said plurality of replicas;
   wherein each of said plurality of nodes manages a dataset indicative of which of said plurality of objects has been updated by said write request and not acknowledged by a common tail node;
   wherein each of said plurality of nodes forwards said read request to said common tail node if according to said dataset said selected object has been updated said write request and not acknowledged by said common tail node.

2. The system of claim 1, wherein said disseminating module is defined to disseminate said write request in association with an indicator of said selected write request dissemination topology so as to allow any of other of said plurality of disseminating modules to further disseminate said write request in said network according to said selected write request dissemination topology.

3. The system of claim 2, wherein each said disseminating module forwards an acknowledge message to indicate a compliance with said write request to a common tail node in a reverse version of said selected write request dissemination topology.

4. The system of claim 1, wherein each said disseminating module includes a counter that increments when any write request is received and said disseminating module adds to each said write request a clock dataset so as to allow any of other of said plurality of disseminating modules to add a time tag set according to said counter before further disseminating said write request in said network.

5. The system of claim 4, wherein said clock dataset is used for ordering a disseminating of a plurality of write request including said write request.

6. The system of claim 1, wherein each said disseminating module is defined to receive a read request to read an object of said data from said client and to provide said client with said object from a respective said replica.

7. The system of claim 1, further comprising at least one probe to detect a change in a performance of at least one of said plurality of replicas and a service module sends update messages to update said plurality of write request dissemination topologies according to said change.

8. The system of claim 1, further comprising at least one probe to detect a change in said at least one parameter and a service module which disseminates an update message among at least some of said plurality of nodes to update said plurality of write request dissemination topologies according to said change.

9. The system of claim 8, wherein each of said at least some of said plurality of nodes forward said update message to another of said at least some nodes, waits for an acknowledge message for a predefined period, and forwards said update message to further another of said at least some nodes if said acknowledge message is not received.

10. A system for communicating information among a plurality of nodes of a network, comprising:
    a plurality of disseminating modules installed in a plurality of nodes of a network which hosts a plurality of replicas of data having a plurality of objects, each said disseminating module has access to a dataset defining a plurality of write request dissemination topologies;
    wherein each said disseminating module is defined to receive a write request from a client, to select dynamically one of said plurality of write request dissemination topologies according to at least one parameter of said client, and to disseminate said write request according to said selected write request dissemination topology;
    wherein said disseminating module is defined to disseminate said write request in association with an indicator of said selected write request dissemination topology so as to allow any of other of said plurality of disseminating modules to further disseminate said write request in said network according to said selected write request dissemination topology; wherein each said disseminating module forwards an acknowledge message to indicate a compliance with said write request to a common tail node in a reverse version of said selected write request dissemination topology; wherein said common tail node sends a write request acknowledgment message to said client after receiving said acknowledgment message from at least some of said plurality of disseminating modules.

11. A method for communicating information among a plurality of nodes of a network, comprising:
managing a plurality of replicas of data, said plurality of replicas being stored in a plurality of nodes of a network with one of a plurality of disseminating modules; and
at any of said plurality of nodes a respective disseminating module is defined for:
receiving a write request from a client;
dynamically selecting one of a plurality of write request dissemination topologies according to at least one parameter of at least one of said client, said network and said write request; and
disseminating said write request according to said selected write request dissemination topology;
wherein each of said plurality of write request dissemination topologies defines one of said plurality of nodes as a tail node to which each other node which receives said write request sends a respective acknowledge message.

12. The method of claim 11, wherein a consistent estimator measure of said data remains strongly consistent when at least one of said plurality of replicas fails to follow said write request.

13. The method of claim 11, wherein said write request is disseminated in association with an indicator of said selected write request dissemination topology so as to allow respective said disseminating modules of other of said plurality of nodes to further disseminate said write request in said network.

14. The method of claim 11, wherein each of said plurality of write request dissemination topologies provides a different tradeoff between latency and throughput.

15. The method of claim 11, wherein said at least one parameter is of said client and selected from a group consisting of a service level agreement (SLA) of said client, a payment plan of said client and a ranking of said client.

16. The method of claim 11, wherein said at least one parameter is of said network and selected from a group consisting of a throughput probing outcomes and latency probing outcomes.

17. The method of claim 11, wherein said at least one parameter is of said write request and selected from a group consisting of a size of said write request, an origin of said write request, a latency indicator of said write request.

18. The method of claim 11, wherein according to at least one of said plurality of write request dissemination topologies a first node forwards said write request to a group of nodes each disseminates said write request in a different chain of nodes.

19. The method of claim 11, wherein according to at least one of said plurality of write request dissemination topologies is a star topology.

20. A computer program product for communicating information among a plurality of nodes of a network, comprising:
a non-transitory computer readable storage medium;
first program instructions to manage a plurality of replicas of data, said plurality of replicas being stored in a plurality of nodes of a network with one of a plurality of disseminating modules; and
second program instructions to be used by any of said plurality of disseminating modules for:
receiving a write request from a client;
dynamically selecting one of a plurality of write request dissemination topologies according to at least one parameter of at least one of said client, said network and said write request; and
disseminating said write request according to said selected write request dissemination topology;
wherein said first and second program instructions are stored on said non transitory computer readable storage medium;
wherein each of said plurality of nodes is set to receive a read request to read a selected object of a plurality of objects of said data and to retrieve a copy of said object from a respective of said plurality of replicas;
wherein each of said plurality of nodes manages a dataset indicative of which of said plurality of objects has been updated by said write request and not acknowledged by a common tail node;
wherein each of said plurality of nodes forwards said read request to said common tail node if according to said dataset said selected object has been updated said write request and not acknowledged by said common tail node.

21. A method for communicating information among a plurality of nodes of a network, comprising:
storing a replica of data in a node of a network having a plurality of nodes storing a plurality of replicas;
receiving a write request to update said data at said node from a client;
dynamically selecting a write request dissemination topology from a plurality of write request dissemination topologies according to at least one parameter of at least one of said client, said network, and said write request; and
disseminating said write request among said plurality of nodes according to said selected write request dissemination topology in association with an indicator of said selected write request dissemination topology;
wherein each of said plurality of write request dissemination topologies defines one of said plurality of nodes as a tail node to which each other node which receives said write request sends a respective acknowledge message.

22. The method of claim 21, wherein said receiving comprises adding a time tag to said write request so as to allow another of said plurality of nodes to order the processing of said write request accordingly.

23. The method of claim 22, wherein said time tag is one of a plurality of time tags added by said plurality of nodes to said write request during said disseminating.

24. The method of claim 21, wherein a consistent estimator measure of said data remains strongly consistent when at least one of said plurality of replicas fails to follow said write request.

25. A computer program product for communicating information among a plurality of nodes of a network, comprising:
a non transitory computer readable storage medium;
first program instructions to store a replica of data in a node of a network having a plurality of nodes;
second program instructions to receive a write request to update said data at said node from a client;

third program instructions to dynamically select a write request dissemination topology from a plurality of write request dissemination topologies according to at least one parameter of at least one of said client, said network, and said write request; and fourth program instructions to disseminate said write request among said plurality of nodes according to said selected write request dissemination topology in association with an indicator of said selected write request dissemination topology;

wherein said first, second, third, and fourth program instructions are stored on said non transitory computer readable storage medium;

wherein each of said plurality of write request dissemination topologies defines one of said plurality of nodes as a tail node to which each other node which receives said write request sends a respective acknowledge message.

* * * * *